(12) United States Patent
Cherney

(10) Patent No.: US 6,910,699 B2
(45) Date of Patent: Jun. 28, 2005

(54) MAGNETORHEOLOGICAL FLUID BRAKE AND FORCE-FEEDBACK SYSTEM FOR A STEERING MECHANISM

(75) Inventor: Mark John Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 160 days.

(21) Appl. No.: 10/449,665

(22) Filed: May 30, 2003

(65) Prior Publication Data

US 2004/0238300 A1 Dec. 2, 2004

(51) Int. Cl.[7] ............................................... B62D 7/22
(52) U.S. Cl. .................... 280/89.13; 280/90; 180/402; 188/267.1; 188/267.2
(58) Field of Search ..................... 280/88, 89, 89.13, 280/90; 180/402, 417; 188/267.1, 267.2

(56) References Cited

U.S. PATENT DOCUMENTS

| 881,472 | A | | 3/1908 | Hollister |
| 908,365 | A | | 12/1908 | Ward |
| 1,450,679 | A | | 4/1923 | Grafenstatt |
| 3,417,771 | A | | 12/1968 | Ernst ........................ 137/81.5 |
| 4,771,846 | A | | 9/1988 | Venable et al. ............. 180/142 |
| 4,905,807 | A | | 3/1990 | Rohs et al. .................... 192/61 |
| 5,579,863 | A | | 12/1996 | Nelson et al. ............... 180/418 |
| 5,816,372 | A | | 10/1998 | Carlson et al. .......... 188/267.2 |
| 5,842,547 | A | | 12/1998 | Carlson et al. ............. 188/267 |
| 5,984,056 | A | * | 11/1999 | Agnihotri et al. ........ 188/267.2 |
| 6,036,226 | A | | 3/2000 | Brown et al. ............... 280/736 |
| 6,097,286 | A | | 8/2000 | Discenzo .................... 340/465 |
| 6,158,470 | A | | 12/2000 | Ivers et al. ................. 137/807 |
| 6,219,604 | B1 | | 4/2001 | Dilger et al. .................. 701/41 |
| 6,269,925 | B1 | * | 8/2001 | Brunken ..................... 192/21.5 |
| 6,283,859 | B1 | | 9/2001 | Carlson et al. ............... 463/36 |
| 6,321,766 | B1 | | 11/2001 | Nathenson .................... 137/13 |
| 6,339,419 | B1 | | 1/2002 | Jolly et al. .................. 345/156 |
| 6,373,465 | B2 | | 4/2002 | Jolly et al. .................. 345/156 |
| 6,389,343 | B1 | | 5/2002 | Hefner et al. ................. 701/41 |
| 6,535,806 | B2 | * | 3/2003 | Millsap et al. ................ 701/42 |
| 6,612,392 | B2 | * | 9/2003 | Park et al. ................... 180/402 |
| 6,619,444 | B2 | * | 9/2003 | Menjak et al. ........... 188/267.2 |
| 6,679,508 | B2 | * | 1/2004 | Smith et al. ................... 280/90 |
| 6,752,425 | B2 | * | 6/2004 | Loh et al. .................... 280/779 |
| 6,817,437 | B2 | * | 11/2004 | Magnus et al. ............. 180/403 |
| 2001/0052893 | A1 | | 12/2001 | Jolly et al. .................. 345/156 |
| 2002/0108804 | A1 | | 8/2002 | Park et al. ................... 180/444 |

FOREIGN PATENT DOCUMENTS

EP            1 211 159            6/2002

OTHER PUBLICATIONS

Technical Bulletin, LORD Materials Division, 2 pages.

* cited by examiner

*Primary Examiner*—Paul N. Dickson
*Assistant Examiner*—Toan C To

(57) ABSTRACT

A magnetorheological fluid brake utilizing a positive displacement fluid pump adapted to pump a magnetorheological fluid through a viscosity regulator. The viscosity regulator is adapted to controllably vary the viscosity of the magnetorheological fluid, altering the pumping restriction against the fluid pump, resulting in variable resistance to pump shaft rotation relative to the pump housing. An electronic steering system for a work vehicle utilizing the illustrated magnetorheological brake as a resistance device to provide tactile feedback as a function of steering shaft rotational position.

28 Claims, 2 Drawing Sheets

MAGNETORHEOLOGICAL FLUID BRAKE AND FORCE-FEEDBACK SYSTEM FOR A STEERING MECHANISM

FIELD OF THE INVENTION

The present invention is for a controllable brake utilizing a magnetorheological fluid, and for a vehicle steering force-feedback system utilizing said brake as a resistance device.

BACKGROUND OF THE INVENTION

Steering of a work vehicle is typically accomplished by the use an actuator to controllably vary vehicle steering angle. For a work vehicle such as a loader, the actuator comprises one or more hydraulic cylinders that articulate the frame about a vertical pivot near the middle of the vehicle. Traditionally, such steering systems mechanically couple the steering wheel to an orbital control valve to control the flow of hydraulic fluid to the hydraulic cylinders.

Electronic steering systems have commonly been employed in various work vehicles in place of mechanical steering systems to improve performance, provide greater design flexibility, and reduce cost. In electronic steering systems, the steering wheel is not mechanically or fluidly coupled to the steering actuator, rather, a controller commands the actuator to controllably vary vehicle steering angle in proportion to steering wheel rotation.

In conventional electronic steering systems there is no mechanical or fluid connection between the steering wheel and steering actuator, thus, the vehicle operator receives no tactile feedback indicating steering performance. It is therefore desirable to have a resistance device coupled to the steering wheel to simulate the tactile feedback typical with a mechanical steering system.

Resistance devices such as controllable brakes and electric motors have commonly been used to provide tactile feedback in electronic steering systems. One type of controllable brake used in such a manner is the magnetorheological fluid brake disclosed in U.S. Pat. No. 6,373,465.

SUMMARY OF THE INVENTION

The present invention is for an controllable brake utilizing a magnetorheological fluid, and for an vehicle steering command and force-feedback system utilizing said brake as a resistance device.

The magnetorheological fluid brake utilizes a positive displacement fluid pump and a viscosity regulator. The fluid pump is adapted to pump a magnetorheological fluid when the pump shaft is rotated relative to the pump housing. The pumped magnetorheological fluid flows through the viscosity regulator which comprises a flow orifice and an electromagnet adjacent to the flow orifice. The electromagnet is adapted to controllably impart a magnetic field upon the magnetorheological fluid flowing through the flow orifice, thereby varying the viscosity of the magnetorheological fluid, and resulting in variable resistance to pump shaft rotation.

The vehicle steering command and force-feedback system utilizes the above described magnetorheological brake as the resistance device to provide tactile feedback in an electronic steering system. The controller employed in the electronic steering system is adapted to command the magnetorheological brake to controllably vary resistance to steering shaft rotation as a function of steering shaft rotational position.

Although the present invention is illustrated as being used on a loader utilizing frame articulation for steering, it could also be used on work vehicles having an actuator to manipulate steerable wheels for steering, or on track laying vehicles using an actuator to control wheel speed differential for steering.

DETAILED DESCRIPTION

Figure 1:
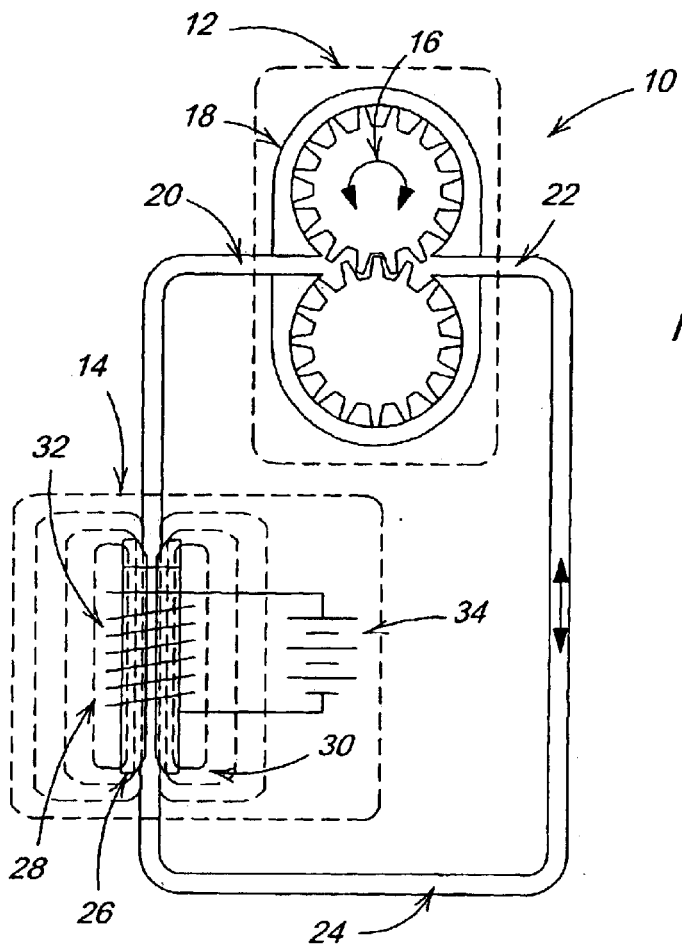
FIG. 1 is a front view schematic for a magnetorheological brake.
Figure 2:
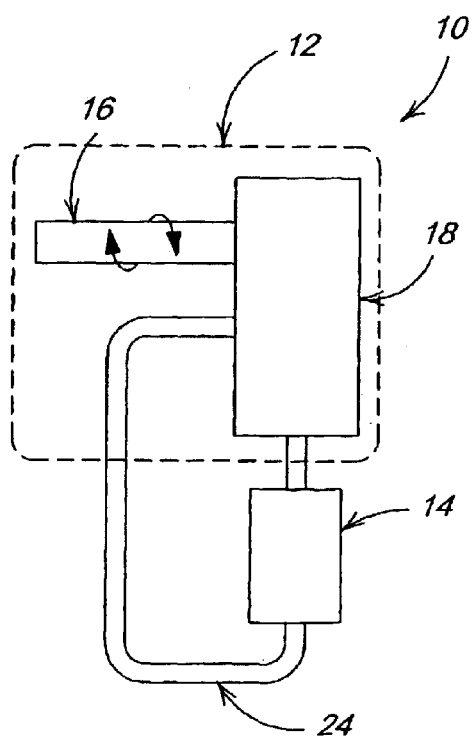
FIG. 2 is a side view schematic for a magnetorheological brake.

FIGS. 1 and 2 illustrate one embodiment for a magnetorheological brake 10 utilizing a positive displacement fluid pump 12 and a viscosity regulator 14. The fluid pump 12 comprises a rotating pump shaft 16, a pump housing 18, a first port 20, and a second port 22. The fluid pump 12 is adapted to pump a magnetorheological fluid 24 from one of the first port 20 or the second port 22 to the other of the first port 20 or the second port 22 when the pump shaft 16 is rotated relative to the pump housing 18. The pumped magnetorheological fluid 24 flows through the viscosity regulator 14 which is fluidly connected between the first port 20 and second port 22. The fluid pump shown in the illustrated embodiment is a positive displacement gear-type pump, but other types, such as for example, gerotor pumps, orbital pumps, screw pumps, vane pumps, or piston pumps could be used as well.

In the illustrated embodiment, the viscosity regulator 14 comprises a flow orifice 26 though which flows the magnetorheological fluid 24, and an electromagnet 28 adjacent to the flow orifice 26. The electromagnet 28 is adapted to controllably impart a magnetic field 30 upon the magnetorheological fluid 24 flowing through the flow orifice 26, thereby varying the viscosity of the magnetorheological fluid 24. In the illustrated embodiment, the electromagnet 28 comprises a coil assembly 32 surrounding the flow control orifice 26 though which an electrical current 34 controllably flows to generate the magnetic field 30.

By varying the viscosity of the magnetorheological fluid 24 locally at the flow orifice 26, the restriction against the fluid pump 12 is thereby altered, resulting in variable resistance to pump shaft 16 rotation relative to the pump housing 18.

Figure 3:
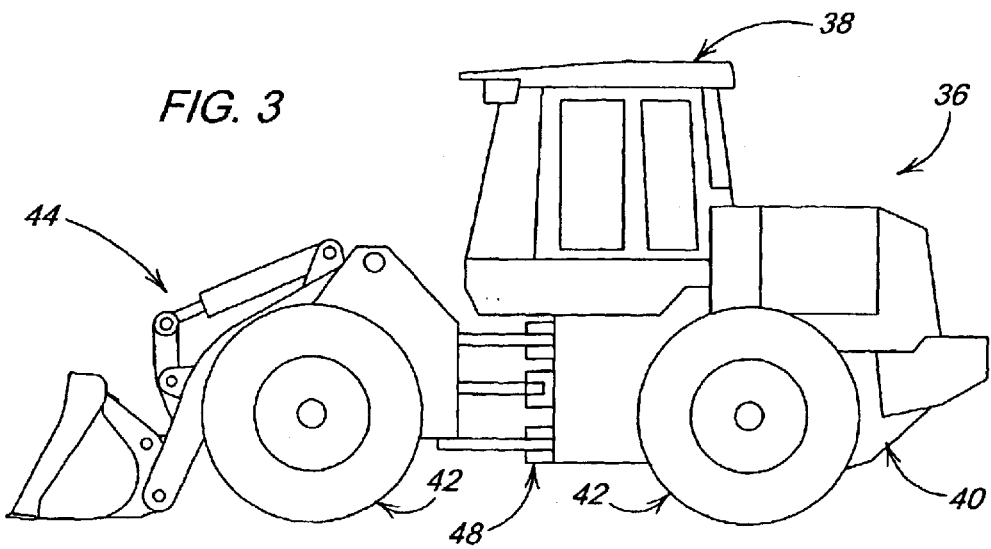
FIG. 3 is a perspective view of a loader.

FIG. 3 illustrates a self-propelled work vehicle, such as a loader 36. An operator controls the functions of the loader 36 from an operator's station 38. The loader has a frame 40, to which are attached ground engaging wheels 42 for supporting and propelling the vehicle. Attached to the front of the vehicle is a loader assembly 44 that performs a variety of excavating and material handling functions.

Steering of a loader 36 is typically accomplished by the use an actuator 46 to articulate the frame 40 about a vertical pivot 48 near the middle of the vehicle. Although the present invention is illustrated as being used on a loader 36 utilizing frame articulation for steering, it could also be used on work vehicles having an actuator 46 to manipulate steerable wheels for steering, or on track laying vehicles using an actuator 46 to control wheel speed differential for steering.

Figure 4:
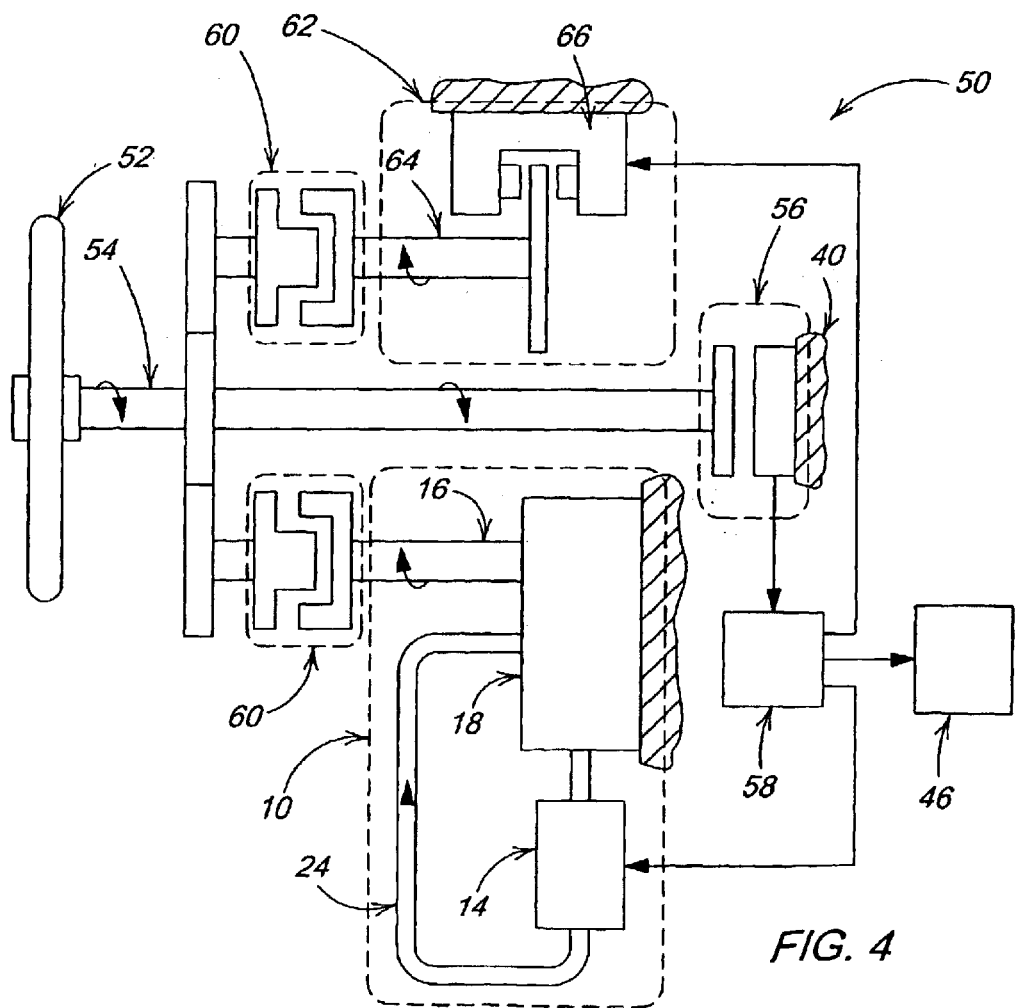
FIG. 4 is a schematic for a vehicle steering force-feedback system using the magnetorheological brake to resist steering shaft rotation.

FIG. 4 illustrates a vehicle steering command and force-feedback system 50 for a work vehicle, such as a loader 36.

In a first embodiment, the steering mechanism comprises a steering wheel 52, a steering shaft 54, a sensor 56 similar to an encoder, the above described magnetorheological brake 10, and a controller 58 in communication with the sensor 56, the magnetorheological brake 10, and the actuator 46 used by the vehicle for steering. In this system, the steering wheel 52 is not mechanically or fluidly coupled to the steering actuator 46.

The steering wheel 52 is adapted for rotation relative to the vehicle frame 40 by a vehicle operator, corresponding to a desired vehicle steering angle. The steering shaft 54 is operatively coupled to the steering wheel 52, with the sensor 56 operatively coupled to the steering shaft 54 to sense the rotational position of the steering shaft 54. The magnetorheological brake 10 is operatively coupled to the steering shaft and is used to provide variable resistance to steering shaft 54 rotation. In the illustrated embodiment, the pump shaft 16 of the magnetorheological brake 10 is operatively coupled to the steering shaft 54, and the pump housing 18 of the magnetorheological brake 10 is attached to the vehicle frame 40, but the steering shaft 54 could just as well be common with the pump shaft 16, or alternatively, the steering shaft 54 could be operatively coupled to the pump housing 18 with the pump shaft 16 being attached to the vehicle frame 40.

To achieve vehicle steering, the controller 58 is adapted command the actuator 46 to controllably vary vehicle steering angle in response to the rotational position of the steering shaft 54 sensed by the sensor 56. For example, when the steering wheel 52 is turned to the right, the sensor 56 senses the movement of the steering wheel 52 and signals the controller 58. In response, the controller 58 commands movement of the steering actuator 46 in proportion to the steering wheel 52 movement sensed by the sensor 58, causing the vehicle 36 to steer to the right.

To provide tactile feedback to the operator simulating a steering system where the steering wheel 52 is mechanically or fluidly linked to the steering actuator 46, the controller 58 is further adapted to command the magnetorheological brake 10 to controllably vary resistance to steering shaft 54 rotation as a function of steering shaft 54 rotational position sensed by the sensor 56. For example, the controller 58 may be adapted to command the magnetorheological brake 10 to impart minimal resistance to steering shaft 54 rotation when the steering wheel 52 is being rotated slowly, and to impart increasing resistance as the steering wheel 52 is turned faster. Similarly, the controller 58 may be adapted to command the magnetorheological brake 10 to impart minimal resistance to steering shaft 54 rotation when the vehicle 10 is moving slowly, and to impart increasing resistance as the vehicle 10 moves faster. The controller 58 may additionally be adapted to command the magnetorheological brake 10 to impart increasing resistance to steering shaft 54 rotation as the resistance to steering actuator 46 movement increases, or when approaching the physical limits of vehicle 36 steering angle.

A function of steering shaft 54 rotational position may include but are not limited to rotational position, rate of rotation, rotational acceleration, and combinations thereof. Additionally, the controller 58 may be adapted to command the magnetorheological brake 10 to controllably vary resistance to steering shaft 54 rotation relative to the frame 40 in response to other sensed inputs, such as resistance to steering actuator 46 movement.

In a second embodiment, the above described steering mechanism further comprises a flexible coupling 60 extending between the steering shaft 54 and one or both of the pump shaft 16 of the magnetorheological brake 10 and the rotating portion 64 of the mechanical brake 62. The coupling 60 operatively couples one or both of the pump shaft 16 of the magnetorheological brake 10 and the rotating portion 64 of the mechanical brake 62 to the steering shaft 52, but provides a small null zone wherein the one or both of the magnetorheological brake 10 and the mechanical brake 62 is unresponsive to steering wheel 52 rotation, thus further simulating and refining the tactile feedback of a steering system where the steering wheel 52 is mechanically or fluidly linked to the steering actuator 46.

In a third embodiment, the above described steering mechanism further comprises a mechanical brake 62 used to inhibit steering shaft 54 rotation relative to the vehicle frame 40. In the illustrated embodiment, a rotating portion 64 of the mechanical brake 62 is operatively coupled to the steering shaft 54, and a stationary portion 66 of the mechanical brake 62 is attached to the vehicle frame 40. In this embodiment, the controller 58 is adapted to inhibit steering shaft 54 rotation relative to the frame 40 as a function of steering shaft 54 rotational position sensed by the sensor 56, or in response to other sensed inputs, such as resistance to steering actuator 46 movement.

Having described the illustrated embodiment, it will become apparent that various modifications can be made without departing from the scope of the invention as defined in the accompanying claims.

What is claimed is:

1. A brake comprising:
   a positive displacement fluid pump having a rotating pump shaft, a pump housing, a first port, and a second port, the pump adapted to pump a magnetorheological fluid from one of the first and the second ports to the other of the first and the second ports when the pump shaft is rotated relative to the pump housing;
   a viscosity regulator fluidly connected between the first port and second port, though which flows the magnetorheological fluid is pumped from the fluid pump, the viscosity regulator adapted to controllably vary the viscosity of the magnetorheological fluid passing there through, thereby varying pumping restriction against the fluid pump, resulting in variable resistance to pump shaft rotation relative to the pump housing.

2. The brake as defined in claim 1 wherein the viscosity regulator comprises a flow orifice though which flows the magnetorheological fluid pumped from the fluid pump, and an electromagnet adjacent to the flow orifice, the electromagnet adapted to controllably impart a magnetic field upon the magnetorheological fluid flowing through the flow orifice, thereby varying the viscosity of the magnetorheological fluid.

3. The brake as defined in claim 2 further comprising a controller in communication with the viscosity regulator, the controller adapted to command the viscosity regulator to controllably vary the viscosity of the magnetorheological fluid passing there through.

4. The brake as defined in claim 3 wherein the fluid pump is a gear-type pump.

5. The brake as defined in claim 2 wherein the electromagnet comprises a coil assembly surrounding the flow control orifice though which an electrical current controllably flows, the coil assembly adapted to variably impart the magnetic field upon the magnetorheological fluid flowing through the flow orifice in proportion to the magnitude of the electrical current.

6. The brake as defined in claim 5 further comprising a controller in communication with the viscosity regulator, the controller adapted to command the viscosity regulator to controllably vary the viscosity of the magnetorheological fluid passing there through.

7. The brake as defined in claim 6 wherein the fluid pump is a gear-type pump.

8. A brake comprising:
   a positive displacement fluid pump having a rotating pump shaft, a pump housing, a first port, and a second port, the pump adapted to pump a magnetorheological fluid from one of the first and the second ports to the other of the first and the second ports when the pump shaft is rotated relative to the pump housing;
   a viscosity regulator fluidly connected between the first port and second port, the viscosity regulator comprising a flow orifice though which flows the magnetorheological fluid pumped from the fluid pump, and an electromagnet adjacent to the flow orifice, the electromagnet adapted to controllably impart a magnetic field upon the magnetorheological fluid flowing through the flow orifice, thereby varying the viscosity of the magnetorheological fluid, and thus varying the pumping restriction-against the fluid pump, resulting in variable resistance to pump shaft rotation relative to the pump housing.

9. The brake as defined in claim 8 further comprising a controller in communication with the viscosity regulator, the controller adapted to command the viscosity regulator to controllably vary the viscosity of the magnetorheological fluid passing there through.

10. The brake as defined in claim 9 wherein the fluid pump is a gear-type pump.

11. The brake as defined in claim 8 wherein the electromagnet comprising a coil assembly surrounding the flow control orifice though which an electrical current controllably flows, the coil assembly adapted to variably impart the magnetic field upon the magnetorheological fluid flowing through the flow orifice in proportion to the magnitude of the electrical current.

12. The brake as defined in claim 11 further comprising a controller in communication with the viscosity regulator, the controller adapted to command the viscosity regulator to controllably vary the viscosity of the magnetorheological fluid passing there through.

13. The brake as defined in claim 12 wherein the fluid pump is a gear-type pump.

14. A steering mechanism for a vehicle having a frame, wheels, and an actuator to controllably vary vehicle steering angle, the mechanism comprising:
   a steering wheel adapted for rotation relative to the vehicle frame by a vehicle operator corresponding to a desired vehicle steering angle;
   a steering shaft operatively coupled to the steering wheel;
   an sensor operatively coupled to the steering shaft adapted sense rotational position of the steering shaft;
   a brake comprising a positive displacement fluid pump having a pump shaft, a pump housing, a first port, and a second port, the pump adapted to pump a magnetorheological fluid from one of the first and the second ports to the other of the first and the second ports when the pump shaft is rotated relative to the pump housing, the brake further comprising a viscosity regulator fluidly connected between the first port and second port, the viscosity regulator comprising a flow orifice though which flows the magnetorheological fluid pumped from the fluid pump, and an electromagnet adjacent to the flow orifice, the electromagnet adapted to controllably impart a magnetic field upon the magnetorheological fluid flowing through the flow orifice, thereby varying the viscosity of the magnetorheological fluid, and thus varying the pumping restriction against the fluid pump, resulting in variable resistance to pump shaft rotation, and thus variable resistance to steering shaft rotation;
   a controller in communication with the actuator, the sensor, and the viscosity regulator, the controller adapted command the actuator to controllably vary vehicle steering angle in response to rotational position of the steering shaft sensed by the sensor, and the controller further adapted to command the viscosity regulator to controllably vary the viscosity of the magnetorheological fluid passing through, resulting in variable resistance to steering shaft rotation as a function of steering shaft rotational position sensed by the sensor.

15. The steering mechanism as defined in claim 14 wherein the pump shaft is operative coupled to the steering shaft, and the pump housing is attached to the frame.

16. The steering mechanism as defined in claim 15 wherein the viscosity regulator of the brake comprises a flow orifice though which flows the magnetorheological fluid pumped from the fluid pump, and an electromagnet adjacent to the flow orifice, the electromagnet adapted to controllably impart a magnetic field upon the magnetorheological fluid flowing through the flow orifice, thereby varying the viscosity of the magnetorheological fluid.

17. The steering mechanism as defined in claim 16 wherein the electromagnet of the viscosity regulator comprises a coil assembly surrounding the flow control orifice though which an electrical current controllably flows, the coil assembly adapted to variably impart the magnetic field upon the magnetorheological fluid flowing through the flow orifice in proportion to the magnitude of the electrical current.

18. The steering mechanism as defined in claim 17 wherein the fluid pump of the brake is a gear-type pump.

19. The steering mechanism as defined in claim 18 further comprising a flexible coupling extending from the pump shaft to the steering shaft, adapted to operatively couple the steering shaft to the pump shaft.

20. The steering mechanism as defined in claim 15 further comprising a mechanical brake having a rotating portion operatively coupled to the steering shaft, and a stationary portion attached to the vehicle frame, wherein the controller is adapted to inhibit steering shaft rotation relative to the frame as a function of steering shaft rotational position sensed by the sensor.

21. The steering mechanism as defined in claim 20 further comprising a flexible coupling extending from the rotating portion of the mechanical brake to the steering shaft, adapted to operatively couple the steering shaft to the rotating portion of the mechanical brake.

22. A steering mechanism for a vehicle having a frame, wheels, and an actuator to controllably vary vehicle steering angle, the mechanism comprising:
   a steering wheel adapted for rotation relative to the vehicle frame by a vehicle operator corresponding to a desired vehicle steering angle;
   a steering shaft operatively coupled to the steering wheel;
   an sensor operatively coupled to the steering shaft adapted sense rotational position of the steering shaft;
   a brake comprising a positive displacement fluid pump having a pump shaft, a pump housing, a first port, and a second port, the pump adapted to pump a magnetorheological fluid from one of the first and the second ports to the other of the first and the second ports when the pump shaft is rotated relative to the pump housing, the brake further comprising a viscosity regulator fluidly connected between the first port and second port, the viscosity regulator comprising a flow orifice though which flows the magnetorheological fluid pumped from the fluid pump, and an electromagnet adjacent to the flow orifice, the electromagnet adapted to controllably impart a magnetic field upon the magnetorheological fluid flowing through the flow orifice, thereby varying the viscosity of the magnetorheological fluid, and thus varying the pumping restriction against the fluid pump, resulting in variable resistance to pump shaft rotation relative to the pump housing;

a controller in communication with the actuator, the sensor, and the viscosity regulator, the controller adapted command the actuator to controllably vary vehicle steering angle in response to rotational position of the steering shaft sensed by the sensor, and the controller further adapted to command the viscosity regulator to controllably vary the viscosity of the magnetorheological fluid passing through, resulting in variable resistance to steering shaft rotation as a function of steering shaft rotational position sensed by the sensor.

23. The steering mechanism as defined in claim 22 wherein the pump shaft is operative coupled to the steering shaft, and the pump housing is attached to the frame.

24. The steering mechanism as defined in claim 23 wherein the electromagnet of the viscosity regulator comprising a coil assembly surrounding the flow control orifice though which an electrical current controllably flows, the coil assembly adapted to variably impart the magnetic field upon the magnetorheological fluid flowing through the flow orifice in proportion to the magnitude of the electrical current.

25. The steering mechanism as defined in claim 24 wherein the fluid pump of the brake is a gear-type pump.

26. The steering mechanism as defined in claim 25 further comprising a flexible coupling extending from the pump shaft to the steering shaft, adapted to operatively couple the steering shaft to the pump shaft.

27. The steering mechanism as defined in claim 23 further comprising a mechanical brake having a rotating portion operatively coupled to the steering shaft, and a stationary portion attached to the vehicle frame, wherein the controller is adapted to inhibit steering shaft rotation relative to the frame as a function of steering shaft rotational position sensed by the sensor.

28. A steering mechanism as defined in claim 27 further comprising a flexible coupling extending from the rotating portion of the mechanical brake to the steering shaft, adapted to operatively couple the steering shaft to the rotating portion of the mechanical brake.

* * * * *